United States Patent
Katagiri et al.

(10) Patent No.: US 6,643,422 B2
(45) Date of Patent: Nov. 4, 2003

(54) OPTICAL SWITCH CHANGEOVER CONTROLLING METHOD, OPTICAL NODE DEVICE AND OPTICAL SWITCH SYSTEM

(75) Inventors: Toru Katagiri, Kawasaki (JP); Satoshi Kuroyanagi, Kawasaki (JP); Tetsuya Nishi, Kawasaki (JP); Ichiro Nakajima, Kawasaki (JP); Takuji Maeda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 185 days.

(21) Appl. No.: 09/797,731

(22) Filed: Mar. 5, 2001

(65) Prior Publication Data

US 2002/0028035 A1 Mar. 7, 2002

(30) Foreign Application Priority Data

Aug. 14, 2000 (JP) ........................................ 2000-245569

(51) Int. Cl.⁷ ................................................. G02B 6/35
(52) U.S. Cl. ............................. 385/16; 385/20; 385/21
(58) Field of Search ....................................... 385/16–23

(56) References Cited

U.S. PATENT DOCUMENTS

| | | | | |
|---|---|---|---|---|
| 5,002,354 A | * | 3/1991 | Koai | 385/21 |
| 5,255,332 A | * | 10/1993 | Welch et al. | 385/17 |
| 5,513,285 A | * | 4/1996 | Kawashima et al. | 385/16 |
| 2002/0122617 A1 | * | 9/2002 | Nakajima et al. | 385/16 |

FOREIGN PATENT DOCUMENTS

| | | | | |
|---|---|---|---|---|
| GB | 2 122 371 A | * | 1/1984 | G02B/5/14 |
| JP | 2-293823 | * | 12/1990 | G02F/1/313 |
| JP | 10-28090 | * | 1/1998 | H04B/10/02 |
| JP | 10-224828 | | 8/1998 | |

* cited by examiner

Primary Examiner—John D. Lee
(74) Attorney, Agent, or Firm—Staas & Halsey LLP

(57) ABSTRACT

The present invention aims at providing an optical switch changeover controlling method, an optical node device and an optical switch system, capable of avoiding an interruption in an optical output power when changing over an optical path making use of a spatial optical switch arranged with a plurality of optical switch elements. To this end, the optical switch changeover controlling method according to the present invention enables an uninterrupted changeover of an optical path by conducting a reconnection of the optical path after establishing a state where the optical path before the changeover and the optical path after the changeover are simultaneously set concerning the spatial optical switch within the optical node device, when conducting a changeover of the optical path so as to transmit a client optical signal having been transmitted through a working ray path to a protective ray path such as in a case that a fault occurs in the working ray path.

11 Claims, 19 Drawing Sheets

OPTICAL SWITCH CHANGEOVER CONTROLLING METHOD, OPTICAL NODE DEVICE AND OPTICAL SWITCH SYSTEM

BACKGROUND OF THE INVENTION

(1) Field of the Invention

The present invention relates to an optical switch changeover controlling technique in conducting a changeover of an optical path by a spatial optical switch comprising a plurality of optical switch elements arranged therein, and particularly to an optical switch changeover controlling method, an optical node device and an optical switch system for realizing an uninterrupted changeover of an optical path.

(2) Related Art

Recently increased information capacities, variation and the like require a flexible and reliable construction of a network as well as an increased capacity of a transmission system. As one way to realize them, there has been demanded a construction of an optical network based on a wavelength division multiplexing (WDM) technique. In constructing such a network, important roles will be played by an optical-switch-adopting optical node device, such as: an optical cross-connect device for setting a bypass route, e.g., when changing over an optical path or when a fault occurs in a transmission path; an optical add drop multiplexer (OADM) for adding/dropping optical signals; and an optical protection device for conducting a recovery from a fault in an optical network.

FIG. 18 is a conceptual diagram for explaining an optical switch changeover controlling method utilizing conventional optical node devices. There is shown an example of a procedure for changing over an optical path from a working ray path to a protective ray path at the time of occurrence of a fault, in which FIG. 18A shows an initial state, FIG. 18B shows a state where a fault occurs, FIG. 18C shows a state where a path release is conducted, and FIG. 18D shows a state where the recovery from the fault has been completed.

In the initial state of FIG. 18A, two optical node devices 1A, 1B are interconnected via a working ray path 2W and a protective ray path 2P. The working ray path 2W is input with a client optical signal sc from a client (terminal equipment) 3A connected to the optical node device 1A, and the protective ray path 2P is input with a PCA optical signal sp from a PCA (Protect Channel Access) device 4A connected to the optical node device 1A.

When a fault such as a disconnection occurs in the working ray path 2W as shown in FIG. 18B, the client optical signal sc being connected to the working ray path 2W is to be changed over to the protective ray path 2P. Concretely, the connection of the PCA optical signal sp having been connected to the protective ray path 2P is once released ("path release") as shown in FIG. 18C, followed by a reconnection of the client optical signal sc to the protective ray path 2P as shown in FIG. 18D to thereby conduct a changeover from the working ray path 2W to the protective ray path 2P at the time of occurrence of the fault.

There will be now briefly explained a changeover operation of optical switches provided in the optical node devices 1A, 1B.

As a typical optical switch to be provided in each of the optical node devices 1A, 1B, there is used an N×N spatial optical switch, for example, which is constituted of matrix-arranged $N^2$ units of 2×2 optical switch elements (in which N is the number of lines to be changed over at the node), where each 2×2 optical switch element has two inputs and two outputs cooperatively changeable into one of a parallel (bar) state and an interlaced (cross) state.

FIG. 19 is a diagram showing an example of a 2×2 spatial optical switch (i.e., N=2) in the transmission side optical node device 1A. There is shown a procedure for changing over, the path of the client optical signal sc connected from an input terminal #1i to an output terminal #1o of the optical node device 1A, to a path from the input terminal #1i to an output terminal #2o.

In a path setting initial state shown in FIG. 19A, an optical path for transmitting the client optical signal sc from the input terminal #1i to the output terminal #1o as shown by a solid line arrow, and an optical path for transmitting the PCA optical signal sp from an input terminal #2i to the output terminal #2o as shown by a dotted line arrow are set. At this time, a 2×2 optical switch element $S_{11}$ at the intersection point between the input terminal #1i and output terminal #1o, and a 2×2 optical switch element $S_{22}$ at the intersection point between the input terminal #2i and output terminal #2o are brought into parallel states (ON states), respectively.

Note, "a 2×2 optical switch element at an intersection point between an input terminal #xi and an output terminal #yo" means such a 2×2 optical switch element in the parallel state: when all 2×2 optical switch elements within a spatial optical switch are once turned into interlaced states (OFF states) and one of the 2×2 optical switch elements is then changed over to a parallel state (ON state) to thereby set an optical path directed from the input terminal #xi to the output terminal #yo.

FIG. 19B shows a state where the already connected two optical paths are released before conducting a changeover of a path connection, in which all the optical switch elements $S_{11}$, $S_{12}$, $S_{21}$, $S_{22}$ are in the interlaced states (OFF states) (path released states).

FIG. 19C shows a path reconnection state where the 2×2 optical switch element $S_{12}$ at the intersection point between the input terminal #1i and the output terminal #2o is brought into the parallel state (ON state) so as to set an optical path from the input terminal #1i to the output terminal #2o to thereby connect the client optical signal sc to the protective ray path 2P.

In the conventional optical node device as described above, there is conducted a consecutive procedure including optical path setting (initial state), optical path release and optical path reconnection, when conducting a connection changeover of an optical signal. Thus, an optical output power (optical output power to the protective ray path 2P) of the output terminal #2o of the optical node device 1A is interrupted in the course of the changeover of the optical path, as shown in FIG. 20. Concretely, this interruption in the optical output power continues over a period of time from the optical path release up to the optical path reconnection, and the interruption period T' can be represented by the following equation (1):

$$T' = T_f + T_{off} + T_r \quad (1)$$

wherein $T_f$ is a falling time of the 2×2 optical switch element, $T_{off}$ is a changeover controlling time (time-lag up to the optical path re-setting), and $T_r$ is a rise time of the 2×2 optical switch element.

As such, the conventional optical node device as described above has a possibility to cause a deterioration of optical signal transmission characteristics or a failure of the device, due to the interruption in the optical output power at the time of changeover of the optical path. Namely, such as when an optical amplifier is arranged on the latter stage side of an optical switch within an optical node device or is arranged within an optical transmission path interconnecting optical node devices, an interruption in optical output power at the time of changeover of an optical path will cause an optical surge in the optical amplifier. This results in a problem of a possibility to cause a deterioration of optical signal transmission characteristics or a failure of the device. Further, the aforementioned optical switch changeover controlling method in the conventional optical node device also has a defect of the time-lag up to the reconnection of the optical path.

SUMMARY OF THE INVENTION

The present invention has been carried out in view of the conventional problems as described above, and it is therefore an object of the present invention to provide an optical switch changeover controlling method, an optical node device and an optical switch system, capable of avoiding an interruption in optical output power at the time of changeover of an optical path.

To achieve the above object, an optical switch changeover controlling method according to the present invention, for using a spatial optical switch which is provided with a plurality of optical switch elements arranged between a plurality of input terminals and a plurality of output terminals thereof, each of the plurality of optical switch elements being controllable to change over a connection between two input ports and two output ports into one of a parallel state and an interlaced state; and having such a characteristic that a power of optical signal to be output from each of the output ports is continuously changed over from a power of optical signal to be input to one of the two input ports, to a power of optical signal to be input to the other of the two input ports, to thereby change over setting of optical paths interconnecting between the plurality of input terminals and the plurality of output terminals of the spatial optical switch, comprises:

when a first optical path directed from a first input terminal to a first output terminal of the spatial optical switch is changed over to a second optical path directed from a second input terminal to the first output terminal, an optical path re-setting step for initiating, re-setting of the respective optical switch elements for forming the second optical path, while keeping the setting of the respective optical switch elements for forming the first optical path, to prepare a state where, for one optical switch element participating in forming both of the first optical path and the second optical path, one of the two input ports is input with an optical signal from the first input terminal and the other of the two input terminals is input with an optical signal from the second input terminal; and an optical path reconnection step for changing over the connection state of the one optical switch element participating in forming both of the first optical path and the second optical path, set in the optical path re-setting step, to the other connection state to thereby release the first optical path and establish the connection of the second optical path.

According to such an optical switch changeover controlling method, when changing over the connection setting of the optical path, there can be temporarily realized, by the path re-setting step, a state where the first optical path before the changeover and the second optical path after the changeover are simultaneously set. This enables an uninterrupted changeover of the optical path, as well as suppression of occurrence of optical surge in optical amplifiers. In this way, it becomes possible to achieve stable transmission characteristics of optical signal, and to reduce the frequency of device failures.

The optical switch changeover controlling method according to the present invention as described above can be applied to an optical node device constituted using a spatial optical switch and to an optical switch system, for example. Further, it is also effective to construct an optical network making use of a plurality of optical node devices to which the present invention is applied.

Further objects, features and advantages of the present invention will become more apparent from the following description of preferred embodiments when read in conjunction with the accompanying drawings.

BRIEF DESCRIPTION OF THE DRAWINGS

FIG. 1 is a conceptual diagram for explaining a basic principle of an optical switch changeover controlling method according to the present invention, in which

FIG. 2 is a diagram showing an example of a 2×2 spatial optical switch to be used in the transmission side optical node device of FIG. 1, in which

FIG. 3 is a conceptual diagram showing a state of an input signal and an output signal when the 2×2 optical switch element to be used in the present invention is changed over from an interlaced state to a parallel state, in which

FIG. 6 is a diagram for explaining an optical switch element utilizing a Mach-Zehnder interferometer usable in the present invention, in which

FIG. 7 is a diagram for explaining an optical switch element utilizing a directional coupler usable in the present invention, in which

FIG. 8 is a diagram for explaining a total reflection type optical switch element usable in the present invention, in which

FIG. 9 is a diagram for explaining an optical switch changeover controlling method according to the present invention in a matrix type 4×4 spatial optical switch, in which

FIG. 10 is a diagram for explaining an optical switch changeover controlling method according to the present invention in a constant interlace type (known as a "PI-Loss: Path-independent Loss" architecture) 4×4 spatial optical switch, in which

FIG. 11 is a diagram for explaining an optical switch changeover controlling method according to the present invention in a tree type 4×4 spatial optical switch, in which

FIG. 16 is a diagram for explaining a changeover operation of a 4×4 spatial optical switch in a node 1 in the optical network of FIG. 14, in which

FIG. 18 is a conceptual diagram for explaining a conventional optical switch changeover controlling method, in which

FIG. 19 is a diagram showing an example of a 2×2 spatial optical switch to be used in a transmission side optical node device in FIG. 18, in which

DETAILED DESCRIPTION OF THE INVENTION

There will be described hereinafter embodiments according the present invention, with reference to the accompanying drawings.

FIG. 1 is a conceptual diagram for explaining a basic principle of an optical switch changeover controlling method according to the present invention. Here, an example of a procedure for changing over an optical path from a working ray path to a protective ray path at the time of occurrence of a fault is shown. Further, FIG. 2 is a diagram showing an example of a 2×2 (two inputs and two outputs) spatial optical switch to be used in the transmission side optical node device of FIG. 1.

Figure 1A:
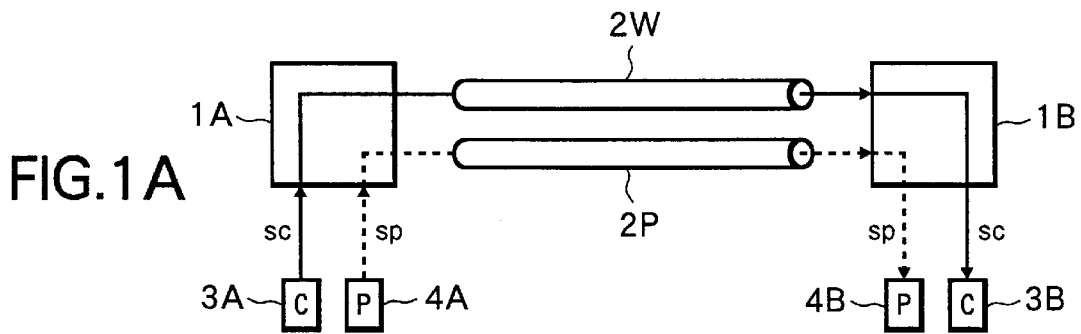
FIG. 1A shows an initial state.
Figure 2A:
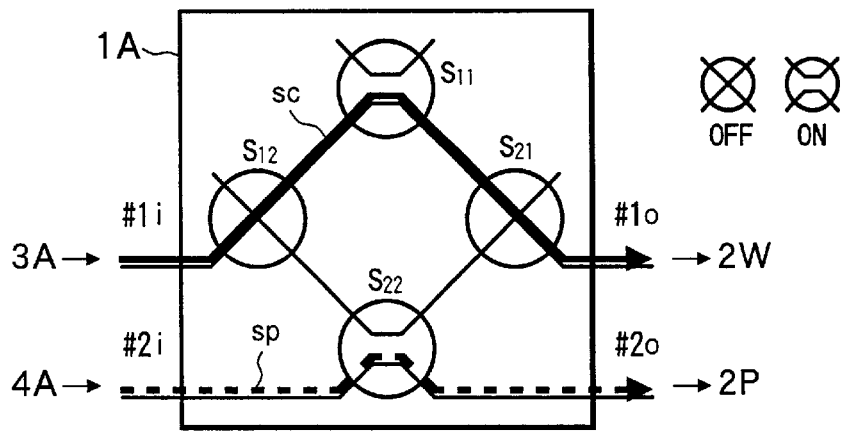
FIG. 2A shows an initial state.

In an initial state shown in FIG. 1A, two optical node devices 1A, 1B are interconnected via a working ray path 2W and a protective ray path 2P. The working ray path 2W is input with a client optical signal sc from a client (terminal equipment) 3A connected to the optical node device 1A, and the protective ray path 2P is input with a PCA optical signal sp from a PCA device 4A connected to the optical node device 1A. As shown in FIG. 2A, a spatial optical switch within the optical node device 1A is set in this initial state, such that: a 2×2 optical switch element $S_{11}$ at an intersection point between an input terminal #1i and an output terminal #1o is set in a parallel state (ON state) so that the client optical signal sc input to the input terminal #1i is output to the working ray path 2W connected to the output terminal #1o, to thereby set an optical path directed from the input terminal #1i to the output terminal #1o; and a 2×2 optical switch element $S_{22}$ at an intersection point between an input terminal #2i and an output terminal #2o is set in a parallel state (ON state) so that the PCA optical signal sp input to the input terminal #2i is output to the protective ray path 2P connected to the output terminal #2o, to thereby set an optical path directed from the input terminal #2i to the output terminal #2o. This type of 2×2 optical switch element is an optical switch capable of conducting crossbar type switching.

Figure 1B:
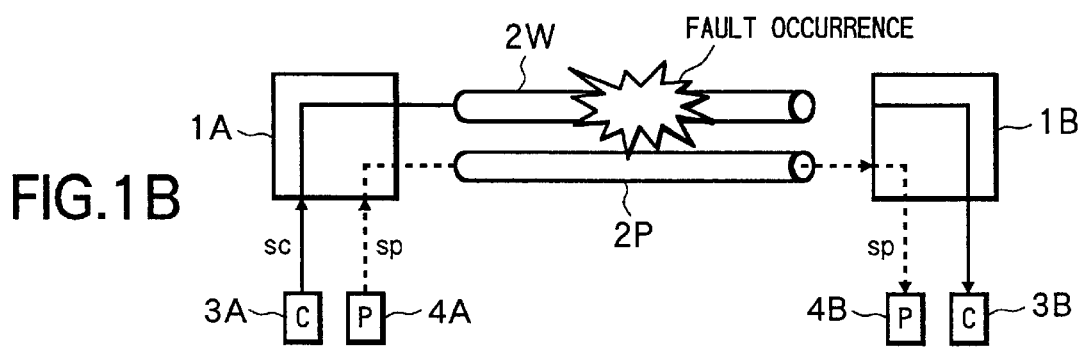
FIG. 1B shows a state where a fault occurs.
Figure 1C:
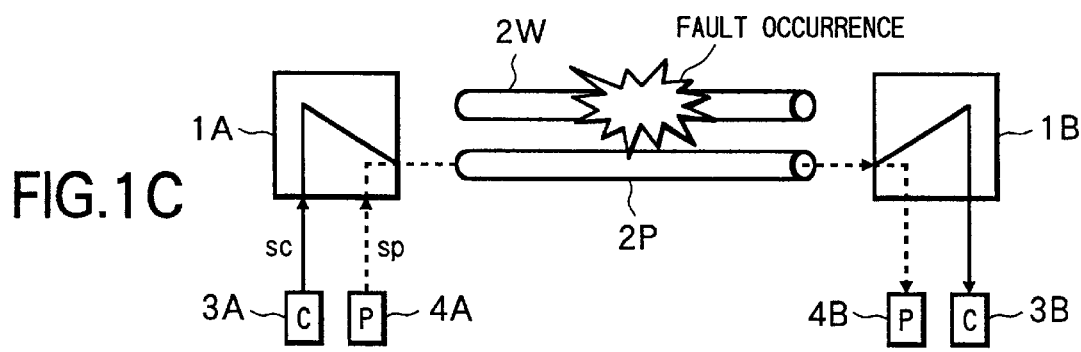
FIG. 1C shows a state where path re-setting is conducted.

When a fault such as occurs in the working ray path 2W as shown in FIG. 1B, there is conducted a connection changeover for transmitting the client optical signal sc being transmitted to the working ray path 2W, to the protective ray path 2P. In the conventional changeover controlling method, the client optical signal sc is duly connected, after the PCA optical signal sp being connected to the protective ray path 2P is once released (path release). However, according to the changeover controlling method of the present invention, optical path re-setting is initiated for connecting the client optical signal sc to the protective ray path 2P, without a connection release (path release) of the PCA optical signal sp. As shown in FIG. 1C, this optical path re-setting temporarily realizes a state where the optical paths before and after the connection changeover are simultaneously set.

Figure 2B:
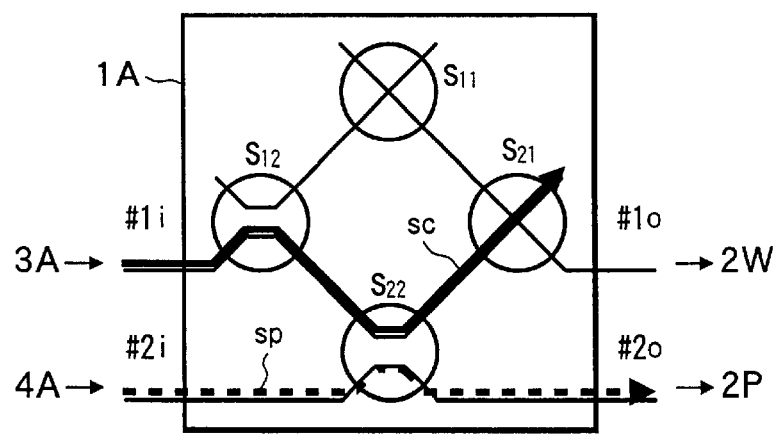
FIG. 2B shows a state of path re-setting.

Concretely, as shown in FIG. 2B, a 2×2 optical switch element $S_{12}$ at an intersection point between the input terminal #1i (second input terminal) and the output terminal #2o (first output terminal) is set in a parallel state (ON state), in preparation for setting an optical path (second optical path) for transmitting the client optical signal sc to the protective ray path 2P, while keeping the setting of the optical path (first optical path) from the input terminal #2i (first input terminal) to the output terminal #2o. At this time, one input port of the 2×2 optical switch element $S_{22}$ at the intersection point between the input terminal #2i and the output terminal #2o is input with the client optical signal sc, and the other input port is input with the PCA optical signal sp, so that the PCA optical signal sp is still output to the protective ray path 2P at this stage.

There will be now briefly explained characteristics of each 2×2 optical switch element to be provided within the optical node devices.

FIG. 3 is a conceptual diagram showing a state of an input signal and an output signal when the 2×2 optical switch element is changed over from an interlaced state (OFF state)

to a parallel state (ON state). FIG. 4 is a graph showing time-wise transitions of powers of optical signals output from respective output ports of the 2×2 optical switch element of FIG. 3.

Figure 3A:
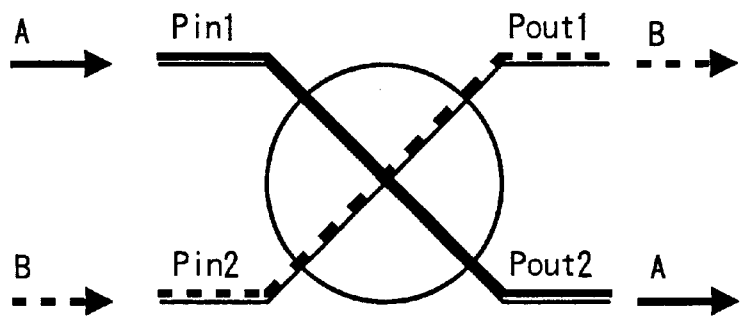
FIG. 3A shows the interlaced state.
Figure 3B:
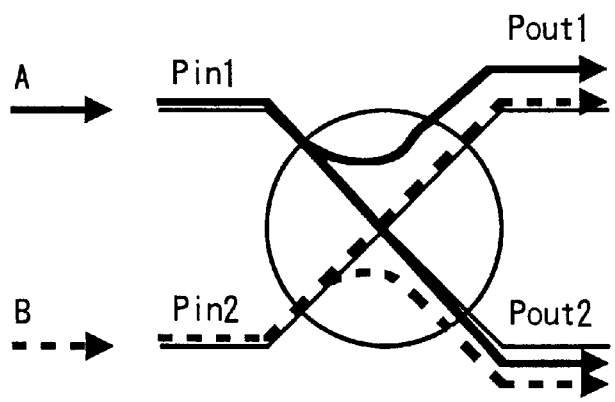
FIG. 3B shows a transitional state.
Figure 3C:
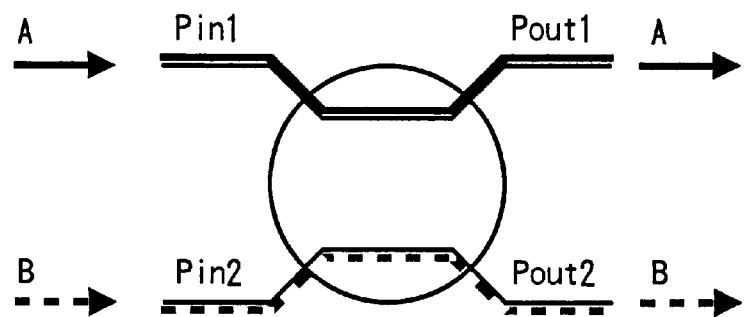
FIG. 3C shows the parallel state.
Figure 4A:
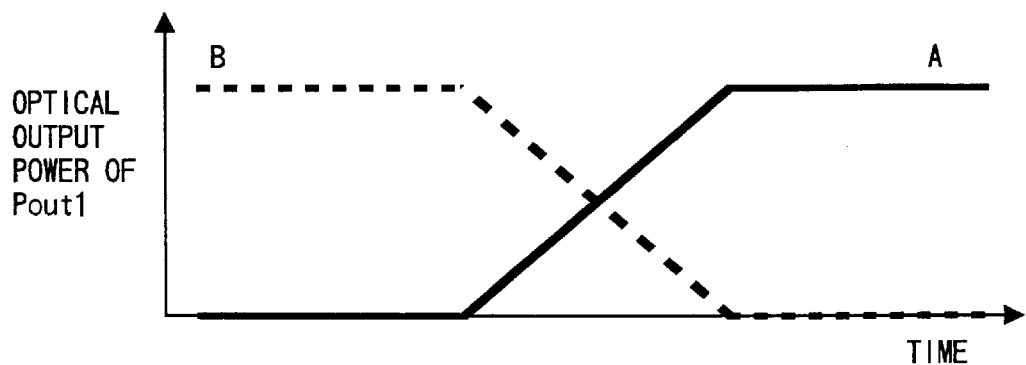
FIGS. 4A–4B are graphs showing time-wise transitions of powers of optical signals output from respective output ports of the 2×2 optical switch element of FIG. 3.
Figure 4B:
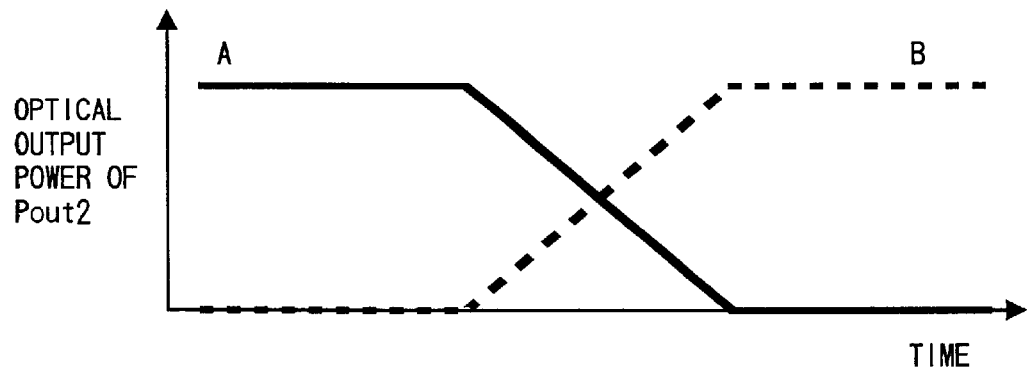

FIG. 3A shows the interlaced state, in which an optical signal A input to an input port Pin1 of the 2×2 optical switch element is output from an output port Pout2, and an optical signal B input to an input port Pin2 is output from an output port Pout1. FIG. 3B shows a state in the course of changeover from the interlaced state to the parallel state, in which both of the optical signal A input to the input port Pin1 and the optical signal B input to the input port Pin2 are output from both of output ports Pout1, Pout2, respectively. FIG. 3C shows the parallel state, in which the optical signal A input to the input port Pin1 is output from the output port Pout1, and the optical signal B input to the input port Pin2 is output from the output port Pout2. As also shown in FIG. 4A and FIG. 4B, it can be understood that an optical signal power to be output from each of the output ports Pout1, Pout2 is continuously changed over from an optical signal power being input to one of the input ports to an optical signal power being input to the other of the input ports.

In a situation where the aforementioned 2×2 optical switch elements are used in the 2×2 spatial optical switch within the optical node device 1A shown in FIG. 2, the optical signal to be output to the protective ray path 2P is continuously changed over from the PCA optical signal sp to the client optical signal sc when the connection state of the 2×2 optical switch element $S_{22}$ (having one input port being input with the client optical signal sc and the other input port being input with the PCA optical signal sp) at the intersection point between the input terminal #2i and the output terminal #2o shown in FIG. 2B is changed over from the parallel state to the interlaced state.

Figure 1D:
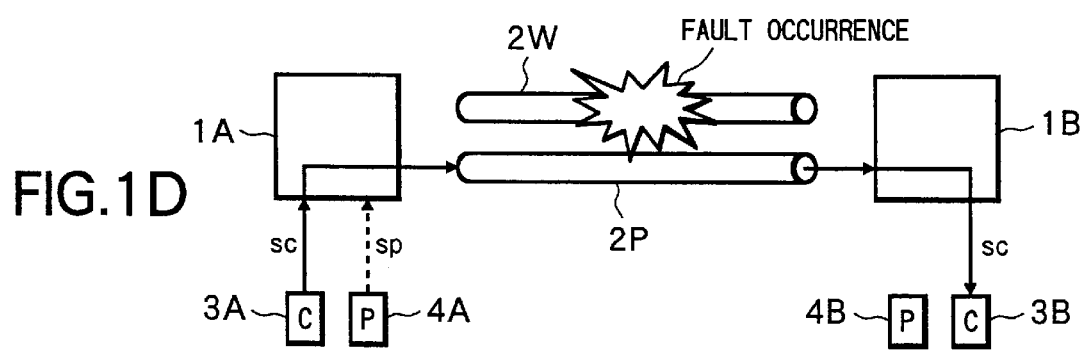
FIG. 1D shows a state where the recovery from the fault has been completed.
Figure 2C:
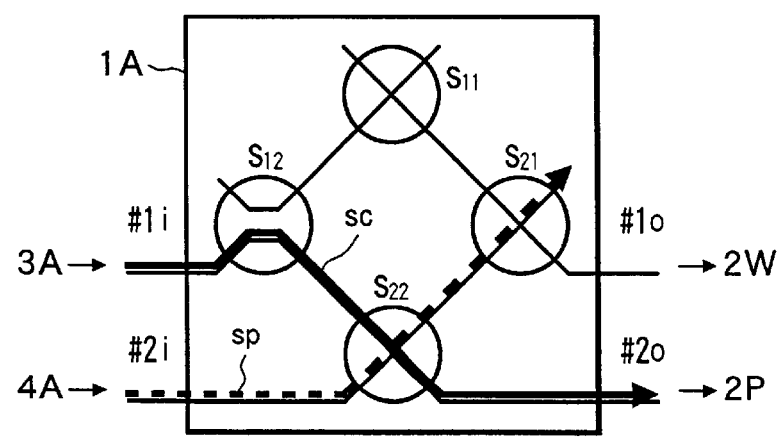
FIG. 2C shows a path reconnection state.

As shown in FIG. 2C, by bringing the 2×2 optical switch element $S_{22}$ at the intersection point between the input terminal #2i and the output terminal #2o into the interlaced state (OFF state), the changeover of the client optical signal sc from the working ray path 2W to the protective ray path 2P is completed, to thereby complete the recovery from the fault occurred in the working ray path 2W, as shown in FIG. 1D.

Figure 5:
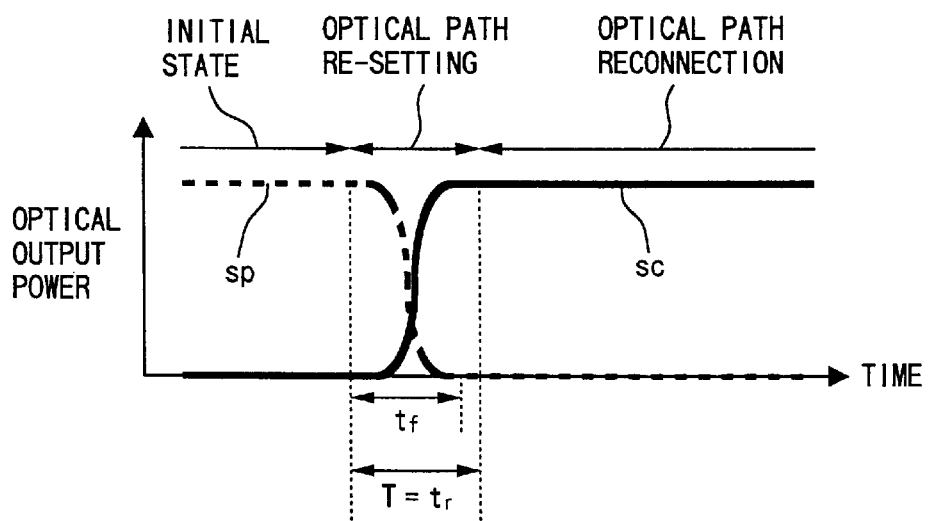
FIG. 5 is a graph showing a transitional state of an optical signal power to be output to a protective ray path in the optical switch changeover controlling method of FIG. 1.

FIG. 5 is a graph showing a transitional state of the optical signal power to be output to the protective ray path 2P during the aforementioned consecutive connection changeover.

As shown in FIG. 5, it can be understood that the optical signal to be output to the protective ray path 2P is continuously changed over from the PCA optical signal sp to the client optical signal sc, to thereby realize the uninterrupted changeover of the optical power. The time T required from the cutoff (re-setting) of the optical path up to the reconnection of the optical path can be represented by the following equation (2), assuming that $T_f$ and $T_r$ are a falling time and a rise time of the 2×2 optical switch element, respectively:

$T=T_f$, when $T_f > T_r$, and $T=T_r$, when $T_f \leq T_r$ (2).

Thus, comparison of the aforementioned changeover time T' according to the conventional method with the changeover time T according to the method of the present invention will show that T<T'. This means that the optical switch changeover controlling method according to the present invention can realize the uninterrupted changeover of the optical power while reducing the changeover time of the optical path.

There will be now concretely described exemplary constitutions of a 2×2 optical switch element allowing a continuous changeover of an optical power as explained with reference to FIGS. 3 and 4.

FIG. 6 is a diagram for showing an exemplary constitution of an optical switch element utilizing a Mach-Zehnder interferometer, and for showing an optical switch characteristic. FIG. 7 is a diagram for showing an exemplary constitution of an optical switch element utilizing a directional coupler, and for showing an optical switch characteristic. Further, FIG. 8 is a diagram for showing an exemplary constitution of a total reflection type optical switch element, and for showing an optical switch characteristic.

Figure 6A:
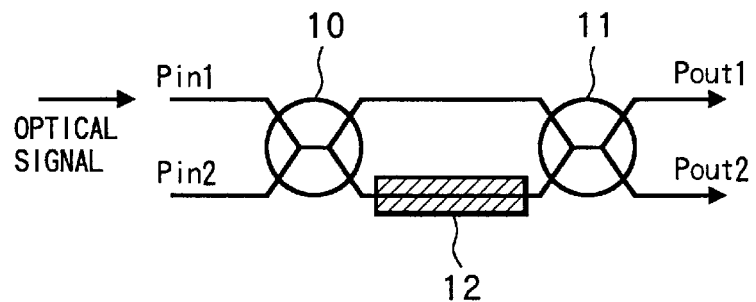
FIG. 6A is a constitutional diagram.
Figure 6B:
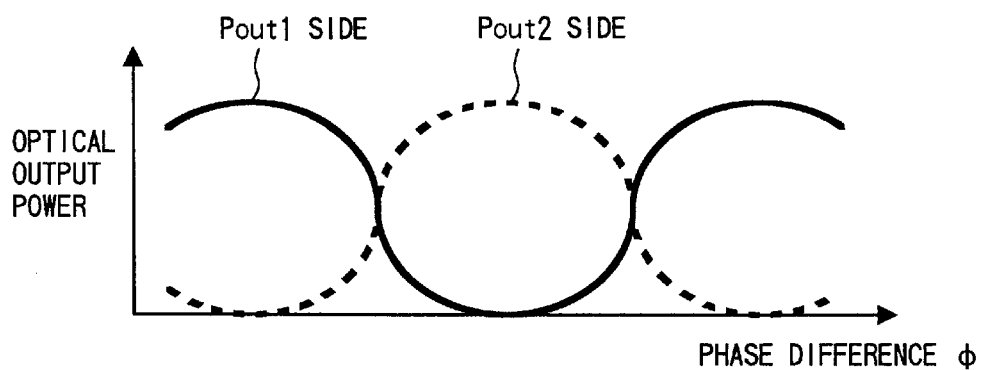
FIG. 6B is a graph showing an optical output power characteristic relative to a controlling parameter.
Figure 6C:
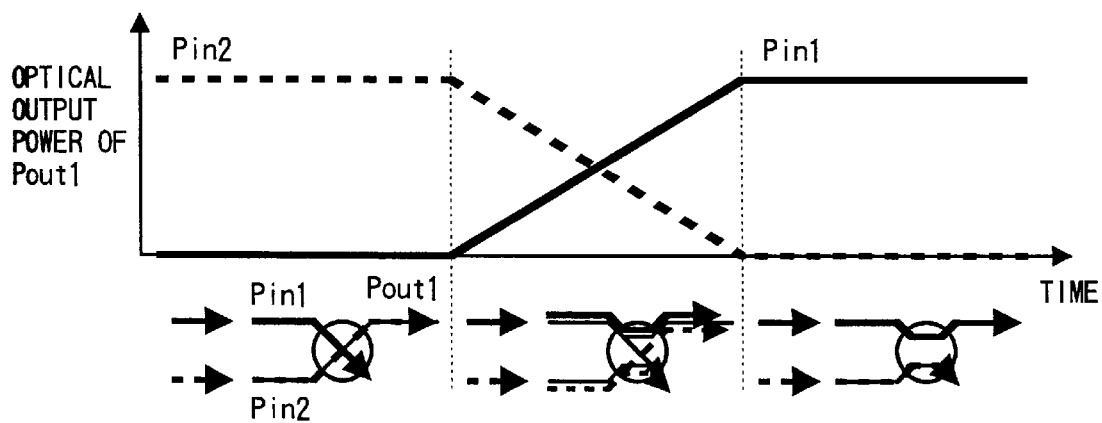
FIG. 6C is a graph showing a transition of an optical output power when the optical switch element is changed over from an interlaced state to a parallel state.
Figure 7A:
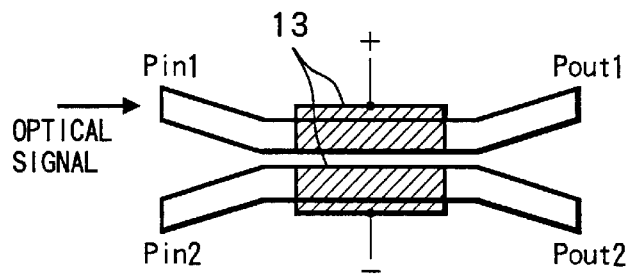
FIG. 7A is a constitutional diagram.
Figure 7B:
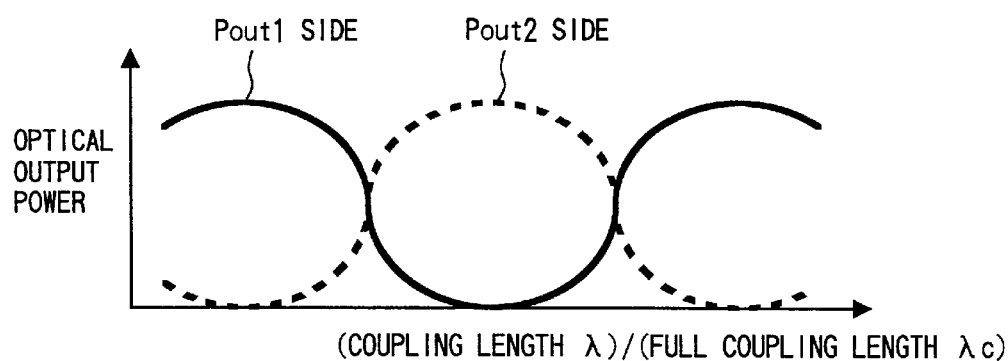
FIG. 7B is a graph showing an optical output power characteristic relative to a controlling parameter.
Figure 7C:
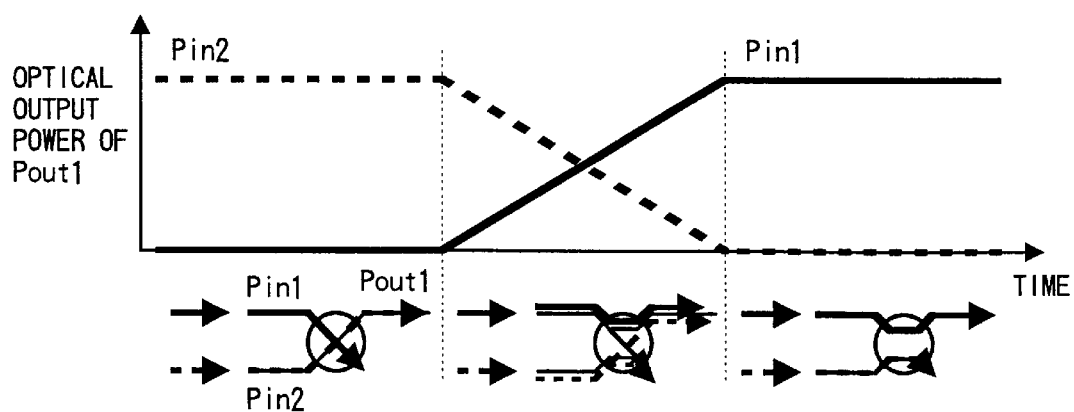
FIG. 7C is a graph showing a transition of an optical output power when the optical switch element is changed over from an interlaced state to a parallel state.
Figure 8A:
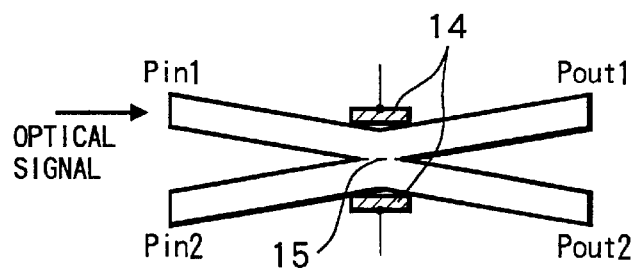
FIG. 8A is a constitutional diagram.

Shown in FIG. 6A, FIG. 7A and FIG. 8A are constitutions of respective optical switch elements. In the optical switch element utilizing the Mach-Zehnder interferometer shown in FIG. 6, the Mach-Zehnder interferometer is formed by interconnecting opposing ports of optical couplers 10, 11 each having four ports, by optical waveguides, respectively. The switching operation of the Mach-Zehnder interferometer is controlled by a heater 12 provided on one of arms of the interferometer. In the optical switch element utilizing the directional coupler of FIG. 7, the directional coupler is constituted of adjacent two optical waveguides. The switching operation of the directional coupler is controlled by changing a ratio between a set coupling length and a full coupling length by a voltage to be applied between electrodes 13 to thereby change the coupling strength. In the total reflection type optical switch element of FIG. 8, the switching operation thereof is controlled by changing a refractive index of a reflection barrier formed at a binding portion between two optical waveguides, by a voltage to be applied between electrodes 14.

Figure 8B:
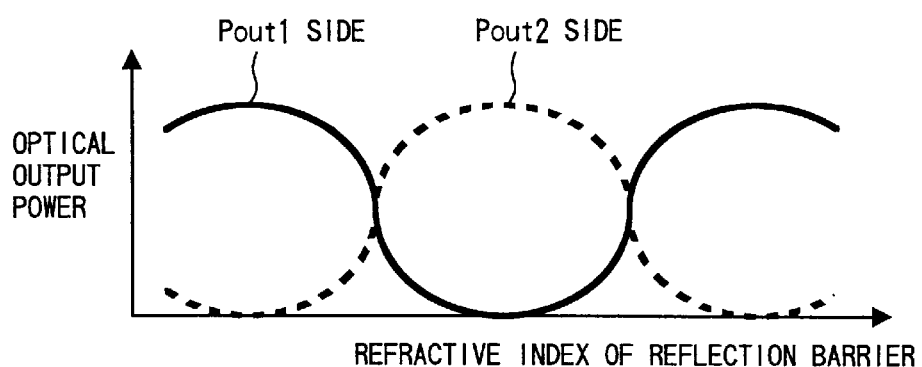
FIG. 8B is a graph showing an optical output power characteristic relative to a controlling parameter.
Figure 8C:
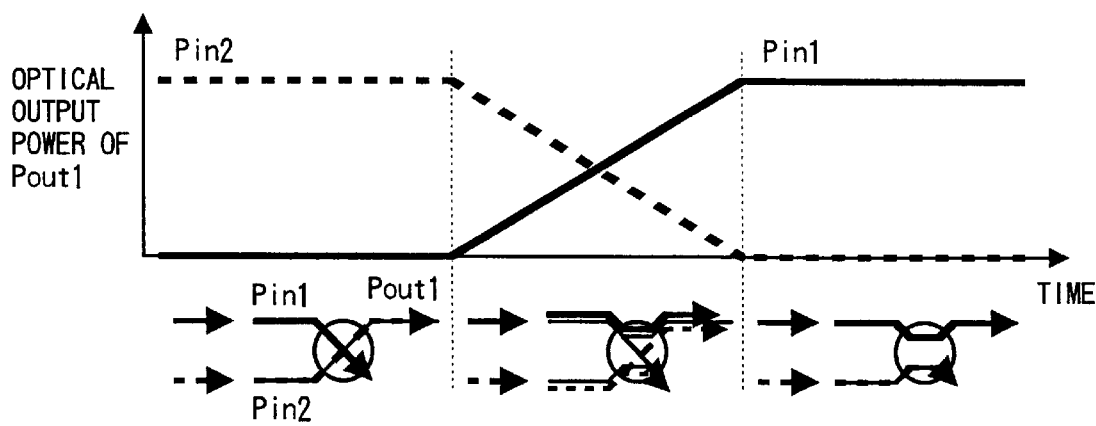
FIG. 8C is a graph showing a transition of an optical output power when the optical switch element is changed over from an interlaced state to a parallel state.

Shown in FIG. 6B, FIG. 7B and FIG. 8B are optical output power characteristics relative to parameters when the respective optical switch elements are controlled, respectively. As understood, there can be obtained the same optical output power characteristic in any of the optical switch elements. Further, shown in FIG. 6C, FIG. 7C and FIG. 8C are transitions of optical output powers when the respective optical switch elements are changed over from interlaced states to parallel states, respectively. As understood, there is shown a characteristic in which the optical output power is continuously changed over from an input signal power of one of the two inputs to that of the other, in any of the optical switch elements.

There will be now described a concrete example of an N×N spatial optical switch utilizing the aforementioned type 2×2 optical switch elements.

FIG. 9 is a diagram for explaining the optical switch changeover controlling method according to the present invention in a matrix type 4×4 spatial optical switch. Further, FIG. 10 is a diagram for explaining the optical switch changeover controlling method according to the present invention in a constant interlace type (known as a "PI-Loss" architecture) 4×4 spatial optical switch. It is noted that each figure shows a procedure at the time of when the 4×4 spatial optical switch is changed over from a state where an optical path directed from an input terminal #1i to an output terminal #1o and another optical path directed from an input terminal #3i to an output terminal #3o, for example are set in initial states, to a state where an optical path directed from the input terminal #1i to the output terminal #3o is set to leave the input terminal #3i to be unconnected.

Figure 9A:
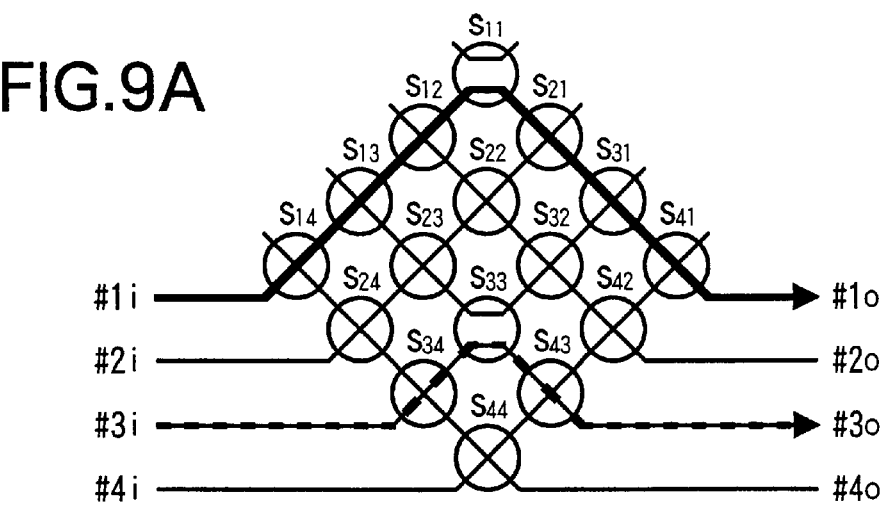
FIG. 9A shows an initial state.
Figure 10A:
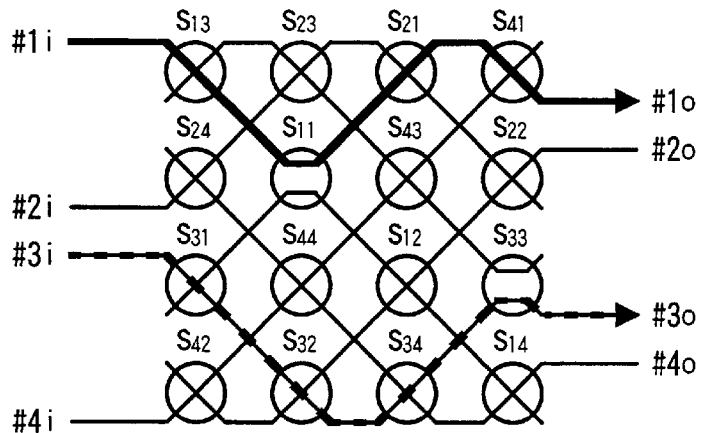
FIG. 10A shows an initial state.

In a path setting initial state as shown in each of FIG. 9A and FIG. 10A an optical switch element $S_{11}$ at an intersection point between an input terminal #1i and an output terminal #1o and an optical switch element $S_{33}$ at an intersection point between an input terminal #3i and an output terminal #3o are set in parallel states (ON states), respectively, to thereby set the optical path directed from the input terminal #1i to the output terminal #1o and the optical path directed from the input terminal #3i to the output terminal #3o. From this state, there is initiated the setting of an optical path directed from the input terminal #1i to the output terminal #3o.

Figure 9B:
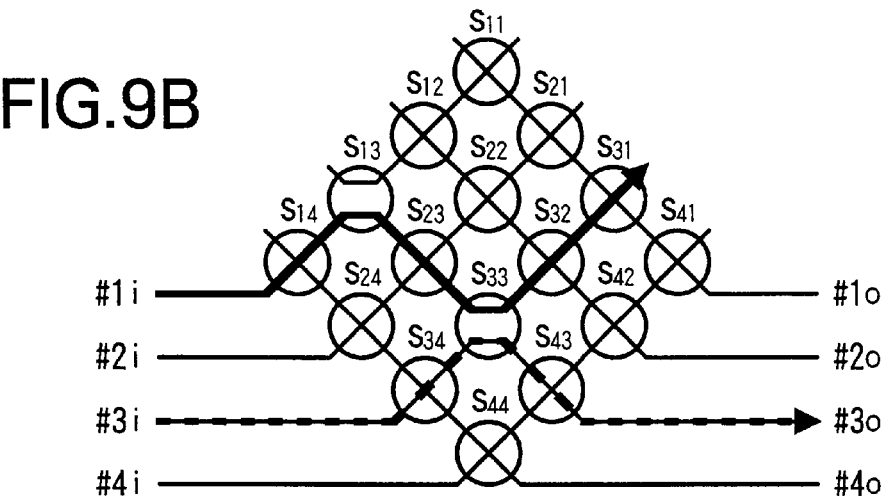
FIG. 9B shows a state of path re-setting.
Figure 9C:
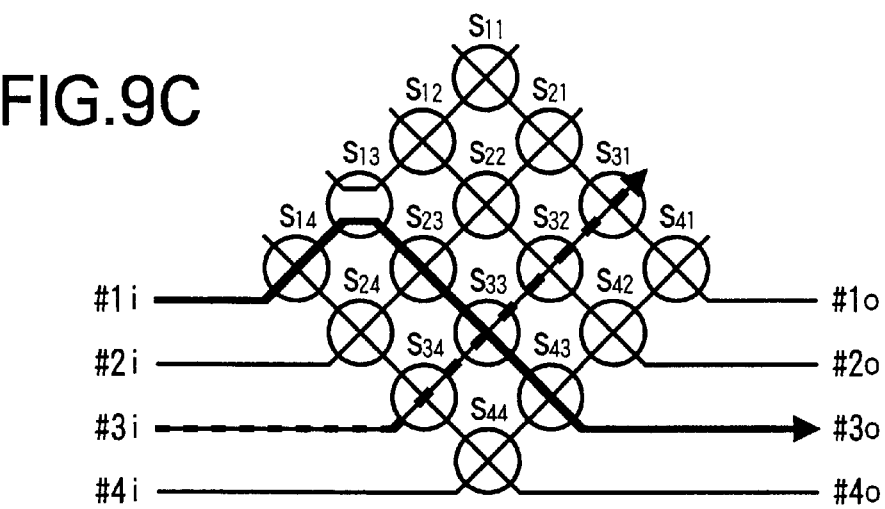
FIG. 9C shows a path reconnection state.
Figure 10B:
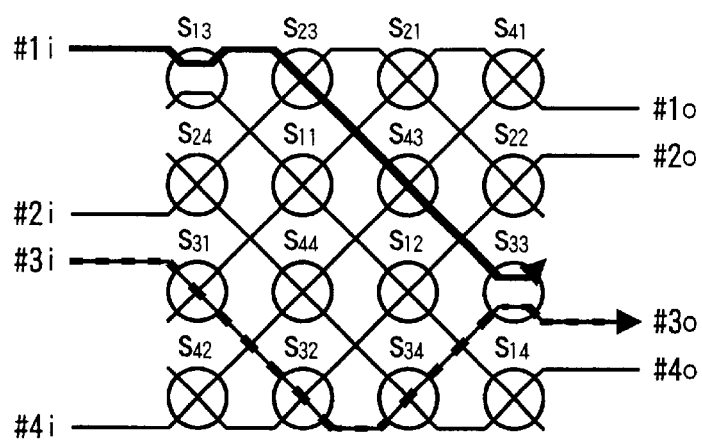
FIG. 10B shows a state of path re-setting.
Figure 10C:
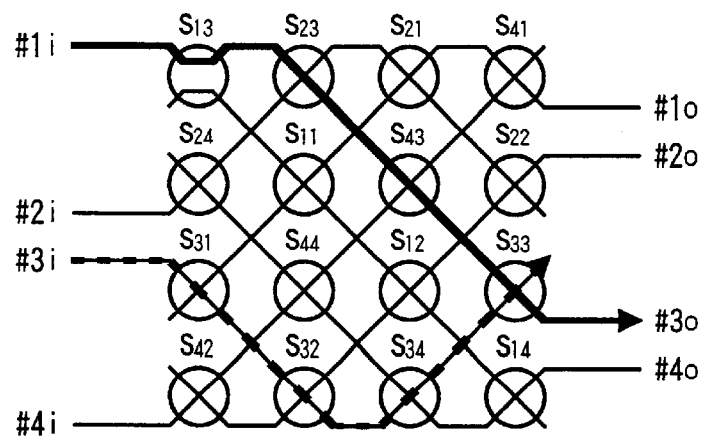
FIG. 10C shows a path reconnection state.

Concretely, as shown in each of path re-setting states of FIG. 9B and FIG. 10B, an optical switch element $S_{13}$ at an intersection point between the input terminal #1i and the output terminal #3o is brought into an ON state, so as to set an optical path directed from the input terminal #1i to the output terminal #3o, while the optical switch element $S_{33}$ setting the optical path directed from the input terminal #3i to the output terminal #3o is kept in the ON state. At this time, one input port of the optical switch element $S_{33}$ is input with the optical signal from the input terminal #1i, and the other input port of the optical switch element $S_{33}$ is input with the optical signal from the input terminal #3i. By switching over the optical switch element $S_{33}$ from the ON state of this path re-setting state to the OFF state in a path reconnection state as shown in each of FIG. 9C and FIG. 10C, the optical signal to be output to the output terminal #3o is changed over from the optical signal of the input terminal #3i to the optical signal of the input terminal #1i in an uninterrupted manner for the optical power, similarly to the aforementioned situation shown in FIG. 5.

FIG. 11 is a diagram for explaining the optical switch changeover controlling method according to the present invention in a tree type 4×4 spatial optical switch. It is noted that 24 units of 2×2 optical switch elements are required for constituting the 4×4 spatial optical switch, in case of the tree type. It is also noted that this kind of tree type spatial optical switch is so typical.

Figure 11A:
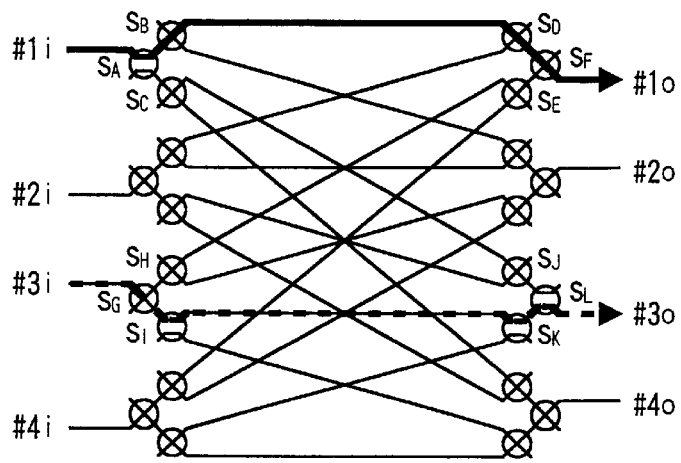
FIG. 11A shows an initial state.
Figure 11B:
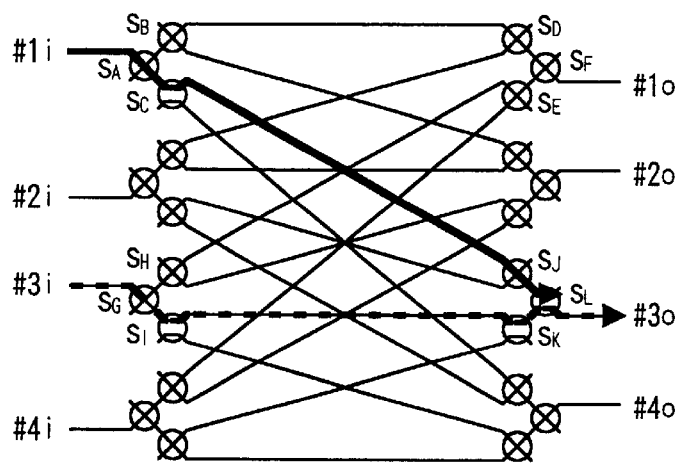
FIG. 11B shows a state of path re-setting.

In a path setting initial state of FIG. 11A, there are set: an optical path directed from an input terminal #1i to an output terminal #1o by bringing an optical switch element $S_A$ to a parallel state (ON state); and an optical path directed from an input terminal #3i to an output terminal #3o by bringing optical switch elements $S_J$, $S_K$, $S_L$ to parallel states (ON states), respectively.

A connection changeover is conducted from this state. However, the number of optical switch elements to be controlled is increased as compared with the situations of spatial optical switches shown in FIGS. 9 and 10, respectively. Thus, the changeover controlling is slightly complicated. Firstly, there is conducted the control of optical switch elements required for establishing the connection from the input terminal #1i to the output terminal #3o, while keeping the current states of the optical switch elements $S_J$, $S_K$, $S_L$, respectively. Namely, as shown in the re-setting state of FIG. 11B, the optical switch element $S_A$ is brought from the parallel state into an interlaced state, and an optical switch element $S_C$ is brought from an interlaced state into a parallel state. At this time, the optical switch element $S_L$ is input with the optical signals from the input terminal #1i and the input terminal #3i.

Figure 11C:
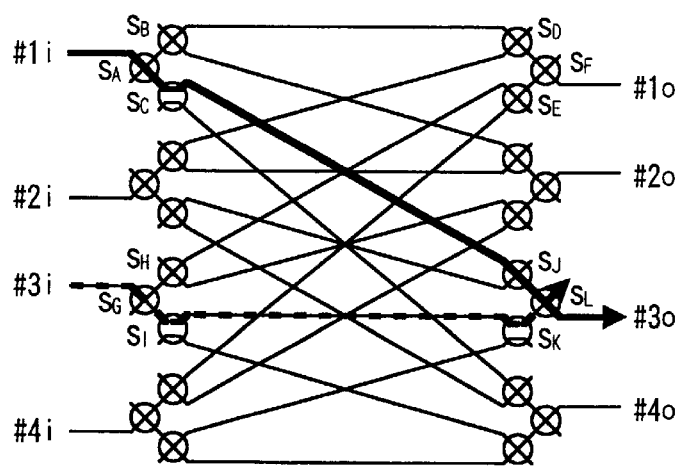
FIG. 11C shows a path reconnection state.

Thus, as shown in the path reconnection state of FIG. 11C, there is established an optical path directed from the input terminal #1i to the output terminal #3o, by finally bringing the optical switch element $S_L$ from the parallel state into the interlaced state. Thus, the optical signal to be output to the output terminal #3o is changed over from the optical signal of the input terminal #3i to the optical signal of the input terminal #1i in an uninterrupted manner for the optical power, similarly to the aforementioned situation shown in FIG. 5.

There will be described hereinafter an optical node device utilizing the optical switch changeover controlling method according to the present invention.

Figure 12:
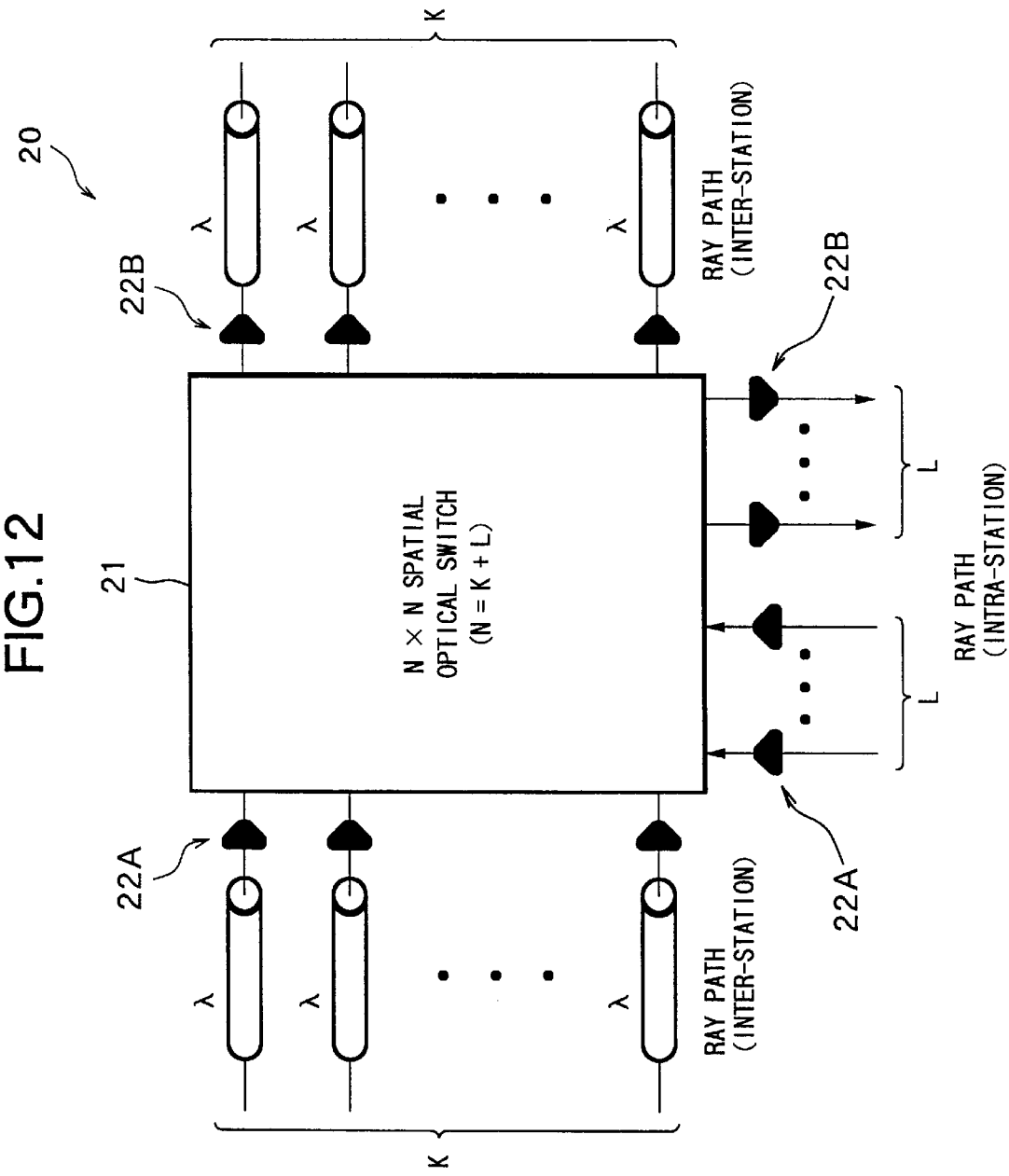
FIG. 12 is a diagram showing an exemplary constitution of an optical node device (without wavelength multiplexing) according to an embodiment of the present invention.

FIG. 12 is a diagram showing an exemplary constitution of the optical node device according to an embodiment of the present invention. Here, as the optical node device, there is assumed an optical cross-connect (optical XC) device using an N×N spatial optical switch. Further, consideration is made for a situation where optical signals (not wavelength multiplexed) of single wavelength are transmitted through ray paths to be connected to input and output ports, respectively.

In FIG. 12, the optical XC device 20 of this embodiment is constituted to comprise: a spatial optical switch 21 provided with N×N (N=K+L) pieces of input and output ports connected to K threads of inter-station input ray paths and K threads of inter-station output ray paths as well as L threads of intra-station input ray paths and L threads of intra-station output ray paths, respectively; and optical amplifiers (pre-amplifiers 22A and post-amplifiers 22B) provided between the spatial optical switch 21 and input and output ray paths, respectively, and to connect the input ray paths to desired output ray paths, respectively, making use of the optical switch changeover controlling method according to the present invention. Although not shown in this figure, the spatial optical switch 21 is supposed to incorporate therein a functional constitution corresponding to controlling means.

In the optical XC device 20 having such a constitution, the connection changeover (optical cross-connect) between the input ray paths and output ray paths in this node is conducted in the optical spatial switch 21, similarly to the aforementioned controlling procedure to be conducted when changing over the optical path from the working ray path to the protective ray path at the time of occurrence of a fault. Thus, there is eliminated any interruption at the time of connection changeover, to thereby avoid an occurrence of an optical surge in the optical amplifiers 22. In this way, it becomes possible to stabilize the transmission characteristics of optical signals and to reduce the frequency of device failures.

Figure 13:
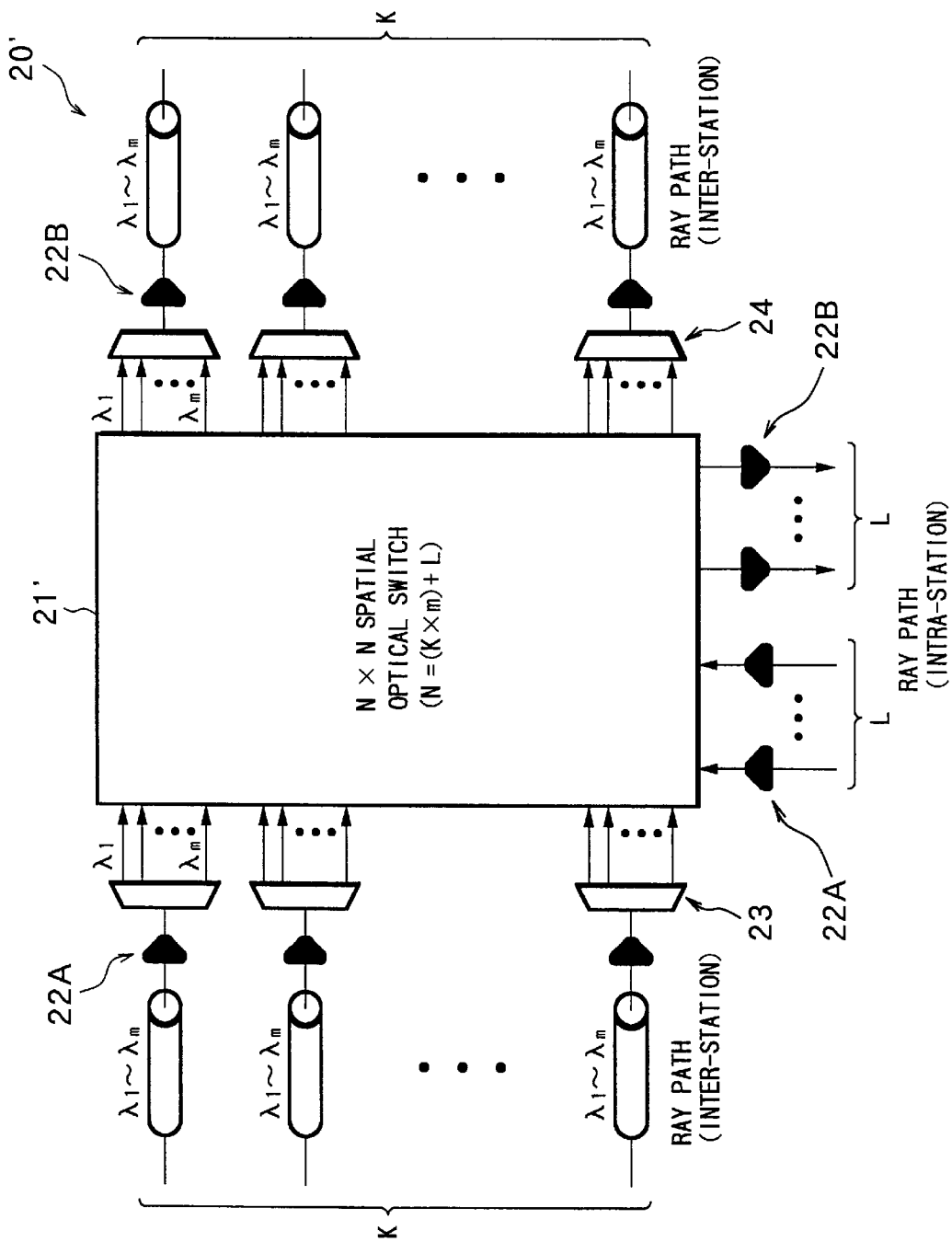
FIG. 13 is a diagram showing an exemplary constitution of an optical node device (with wavelength multiplexing) according to another embodiment of the present invention.

In the optical XC device 20 of the aforementioned embodiment, there has been considered the situation where the optical signals that are not wavelength multiplexed are transmitted through respective ray paths. However, the present invention is not limited thereto, and can be applied to a situation where wavelength multiplexed optical signals are transmitted through ray paths, respectively. FIG. 13 is a diagram showing an exemplary constitution of an optical XC device where wavelength multiplexing is conducted.

In the exemplary constitution of FIG. 13, there are provided: optical demultiplexers 23 for demultiplexing respective WDM optical signals (containing optical signals of wavelengths $\lambda_1$ to $\lambda_m$) transmitted through inter-station input ray paths into optical signals of respective wavelengths; and optical multiplexers 24 for multiplexing the optical signals of wavelengths $\lambda_1$ to $\lambda_m$ output from respective output ports of an spatial optical switch 21' to thereby transmitting the multiplexed optical signals to inter-station output ray paths, respectively. The spatial optical switch 21' is provided with N×N (N=(K×m)+L) pieces of input and output ports for receiving the optical signals of (K×m) waves output from the respective optical demultiplexers 23 and outputting the optical signals of (K×m) waves to the respective optical multiplexers 24, and being connected to L threads of intra-station input ray paths and L threads of intra-station output ray paths. Also, in the optical XC device 20' of the aforementioned constitution, the connection changeovers between input ray paths and output ray paths are conducted in an uninterrupted manner. Thus, there can be obtained the same function and effect as the situation of the optical XC device 20 shown in FIG. 12.

There will be now described an optical network constructed of optical node devices utilizing the optical switch changeover controlling method according to the present invention.

Figure 14:
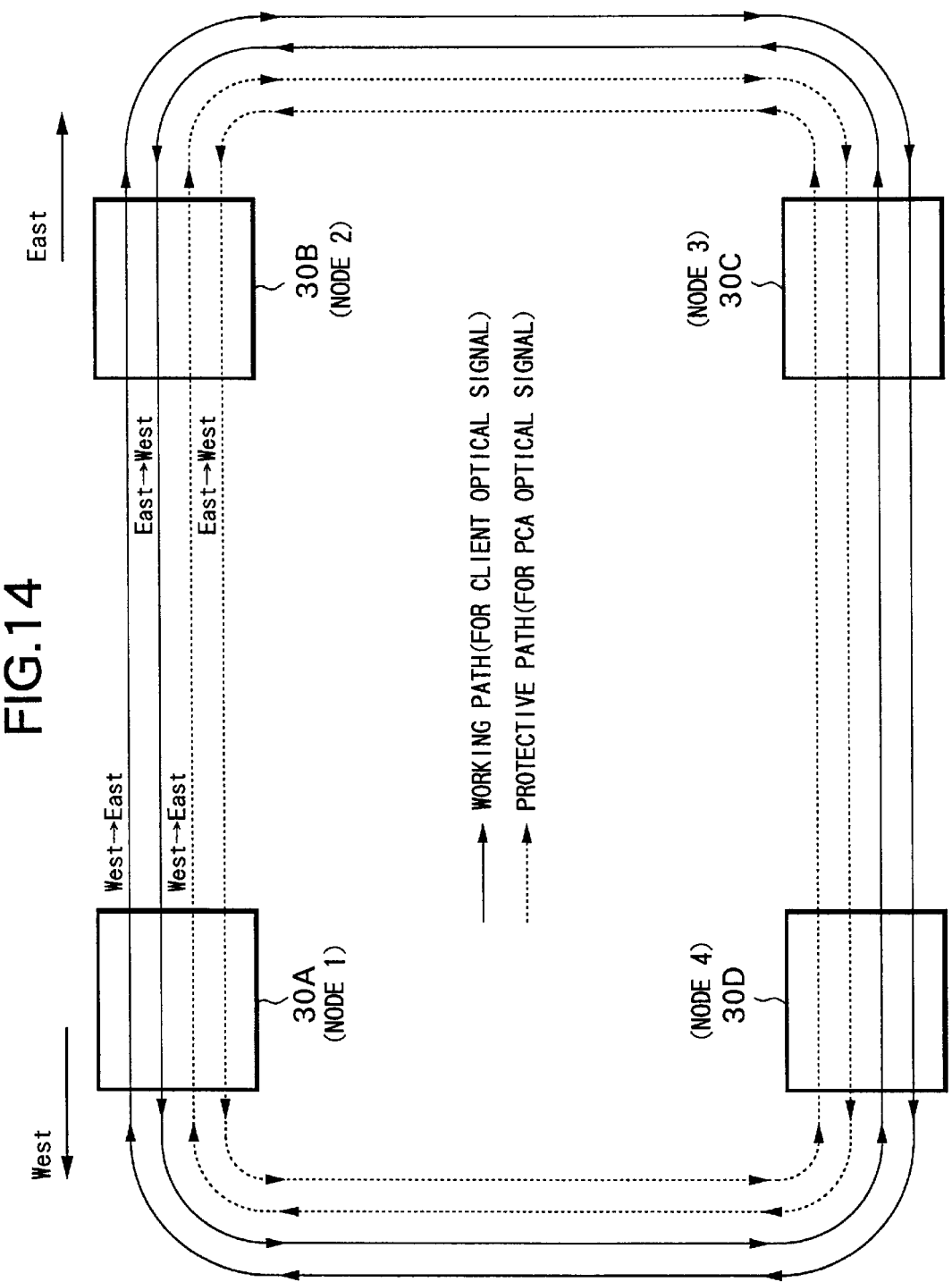
FIG. 14 is a diagram showing an exemplary constitution of an optical network utilizing the optical node device of the present invention.

FIG. 14 is a diagram showing an exemplary constitution of an optical network applied with the present invention. Shown in this figure is an example of a 4-fiber ring network constructed of four units of optical XC devices each capable of accommodating four threads of inter-station input ray paths and four threads of inter-station output ray paths, for example. To simplify the explanation, this optical network is assumed to be of no wavelength multiplexing.

In FIG. 14, the 4-fiber ring network is constituted of optical XC devices 30A, 30B, 30C, 30D interconnected in a ring shape via two threads of clockwise ray paths (from West to East in the figure) and two threads of counterclockwise ray paths (from East to West in the figure). In this 4-fiber ring network, one of the same directional two ray paths is used as a working ray path (solid line arrow in the figure) so as to transmit the client optical signal sc, and the other is used as a protective ray path (dotted line arrow in the figure) so as to transmit the PCA optical signal sp.

Figure 15:
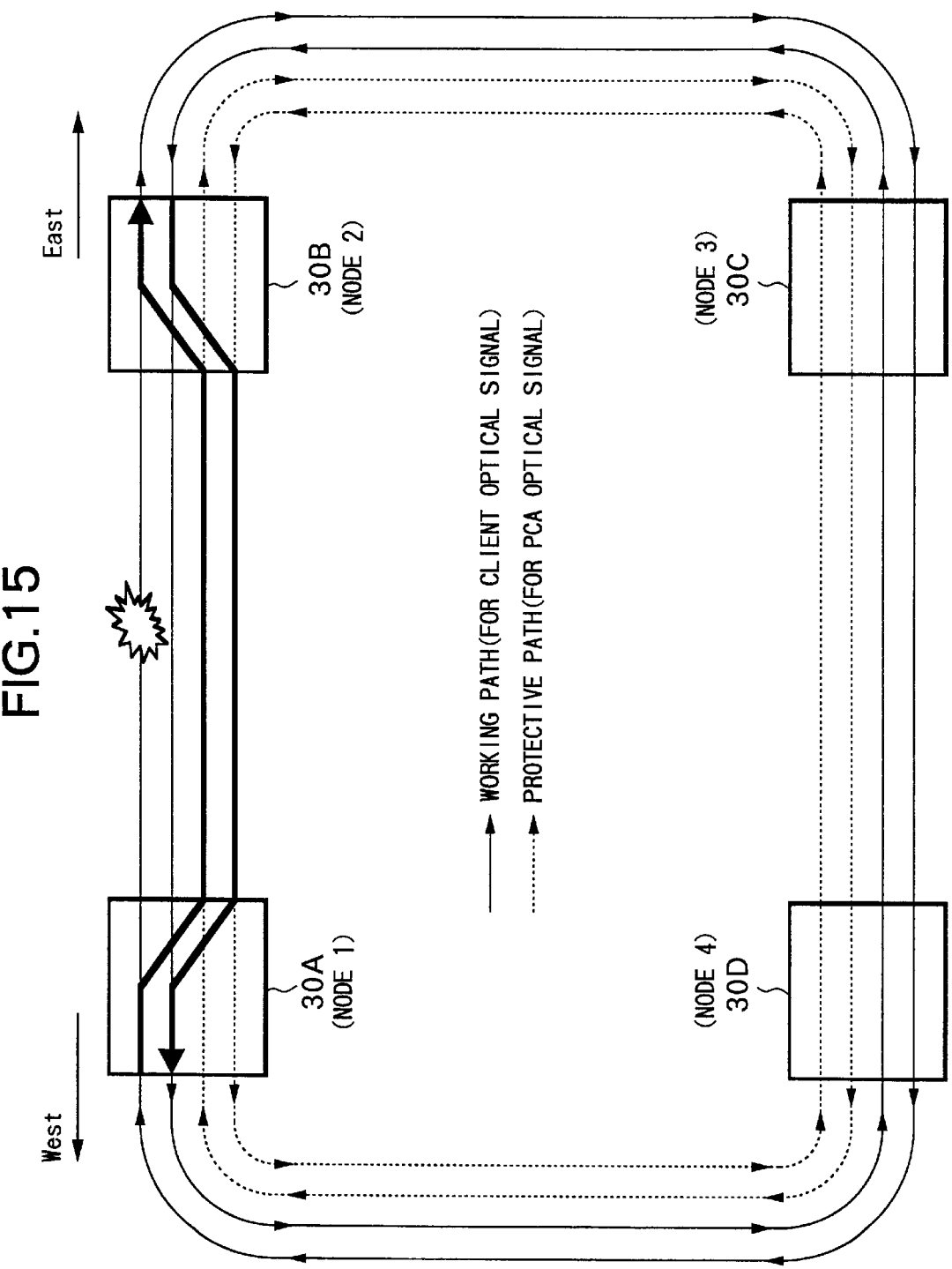
FIG. 15 is a diagram showing a span switch to be conducted at the time of occurrence of a fault in the optical network of FIG. 14.

There will be now considered a situation, for example, as shown in FIG. 15, where a fault such as a fiber disconnection has occurred in the clockwise working ray path between the optical XC device 30A (node 1) and the optical XC device 30B (node 2), in the 4-fiber ring network having the aforementioned constitution. In this case, the client optical signal sc having been transmitted through the working ray path between the node 1 and node 2 is changed over from the working ray path to the protective ray path by a span switch between the node 1 and node 2.

FIG. 16 is a diagram for explaining a changeover operation of a 4×4 spatial optical switch in the optical XC device 30A (node 1).

Figure 16A:
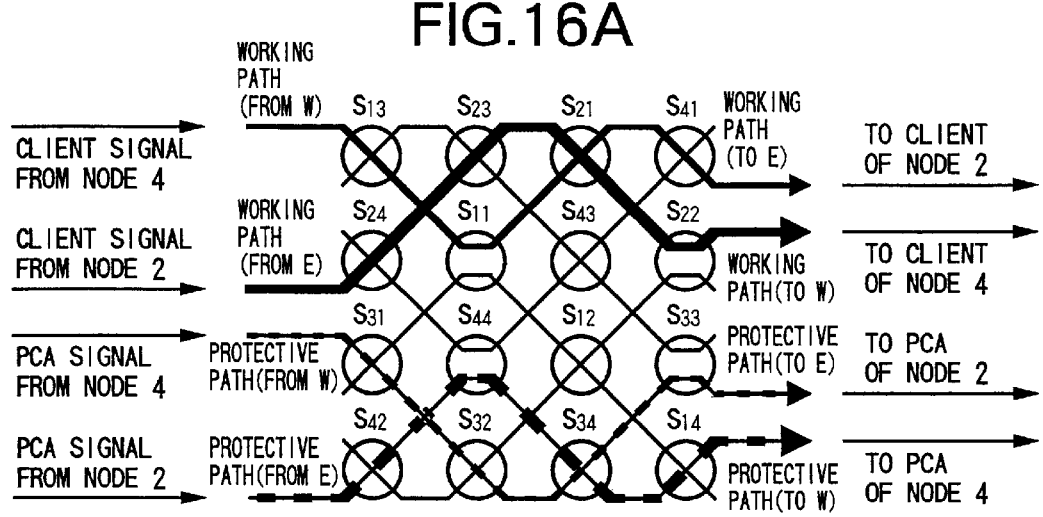
FIG. 16A shows an initial state.

The path connection (initial state) shown in FIG. 16A is set such that: the clockwise client optical signal sc is transmitted through an optical path directed from the working path (from W) to the working path (to E); the counterclockwise client optical signal sc is transmitted through an optical path directed from the working path (from E) to the working path (to W); the clockwise PCA optical signal sp is transmitted through an optical path directed from the protective path (from W) to the protective path (to E); and the counterclockwise PCA optical signal sp is transmitted through an optical path directed from the protective path (from E) to the protective path (to W).

When a fault occurs in the clockwise working ray path between the node 1 and node 2: the clockwise client optical signal having been connected to the working path (to E) which is one of the output side ports is changed over to the protective path (to E); and the optical signal having been connected to the protective path (from E) is changed over from the protective path (to W) to the working path (to W).

Figure 16B:
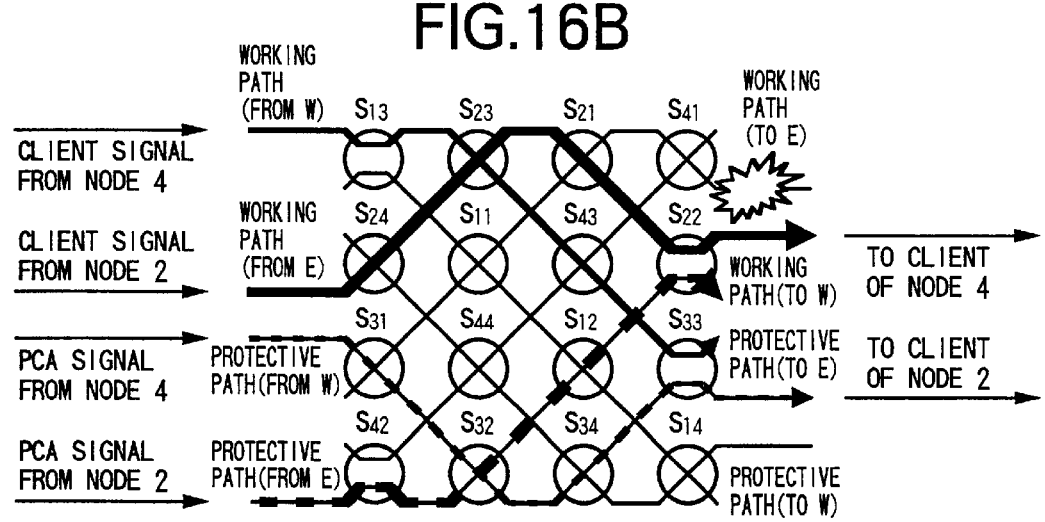
FIG. 16B shows a state of path re-setting.

In this case, as shown in FIG. 16B under protection (path re-setting), there is initiated such path re-setting that an optical switch element $S_{13}$ is brought into a parallel state (ON state) so as to set an optical path directed from the working path (from W) to the protective path (to E), and an optical switch element $S_{42}$ is brought into a parallel state (ON state) so as to set an optical path directed from the protective path (from E) to the working path (to W), while keeping the connected states of the counterclockwise optical path directed from the working path (from E) to the working path (to W) and the clockwise optical path directed from the protective path (from W) to the protective path (to E).

Figure 16C:
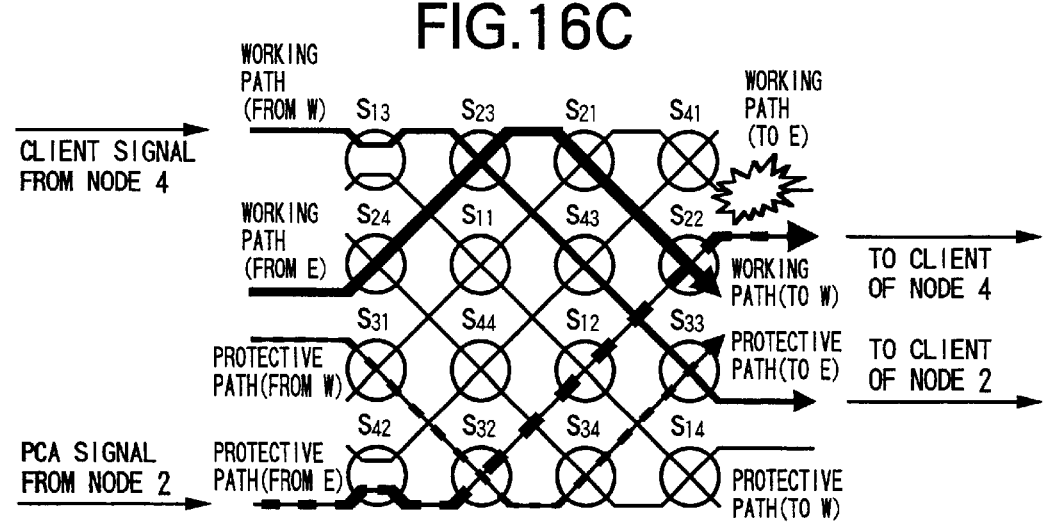
FIG. 16C shows a path reconnection state.

Then, as shown in the completion of the protection of FIG. 16C (path re-connection), the optical path from the protective path (from W) to the protective path (to E) is released by changing over an 2×2 optical switch element $S_{33}$ from an ON state to an OFF state, to thereby set an optical path directed from the working path (from W) to the protective path (to E). Simultaneously, the optical path directed from the working path (from E) to the working path (to W) is released by changing over an optical switch element $S_{22}$ from an ON state to an OFF state, to thereby set an optical path directed from the protective path (from E) to the working path (to W). In this way, the recovery from the fault is completed (i.e., the span switch is completed).

Figure 17:
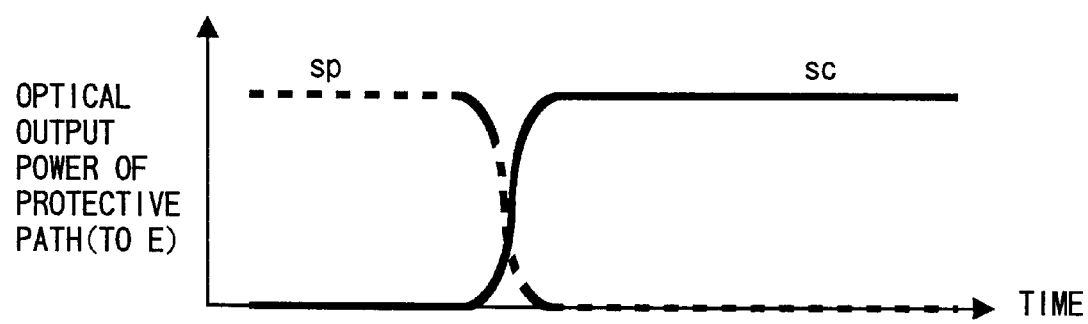
FIG. 17 is a graph showing a transition of an optical power to be output from a protective path (to E) at the output side of the 4×4 spatial optical switch at the time of connection changeover of FIG. 16.
Figure 18A:
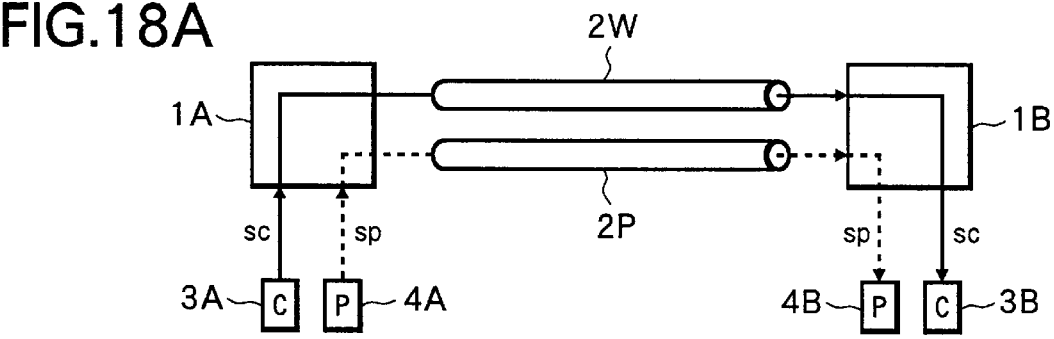
FIG. 18A shows an initial state.
Figure 18B:
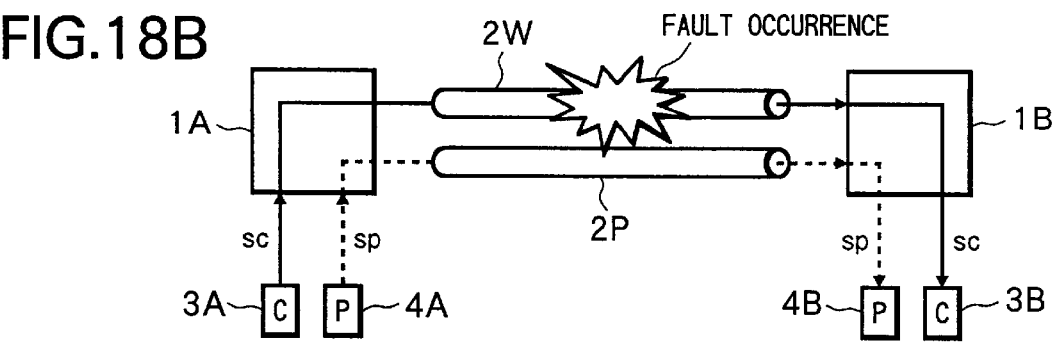
FIG. 18B shows a state where a fault occurs.
Figure 18C:
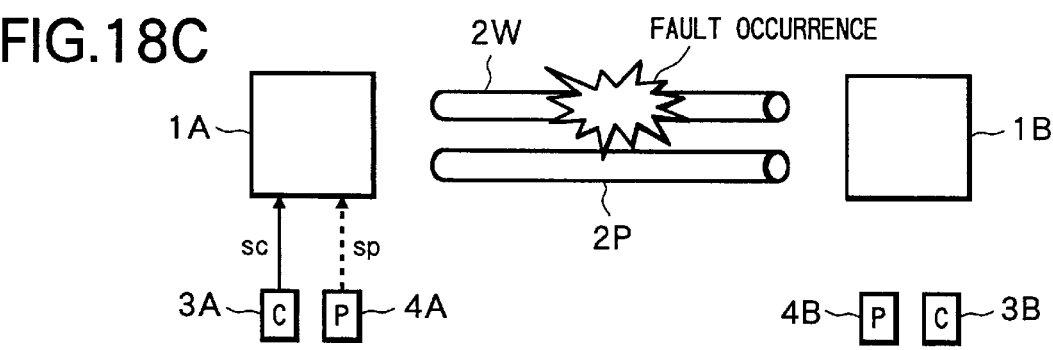
FIG. 18C shows a state where path release is conducted.
Figure 18D:
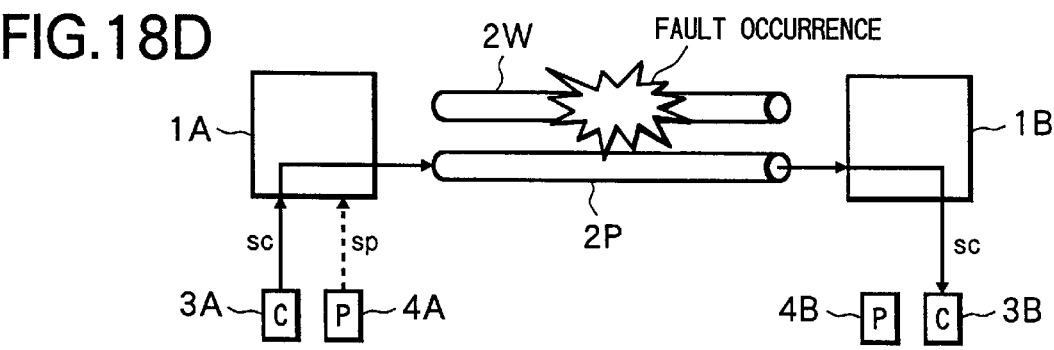
FIG. 18D shows a state where the recovery from the fault has been completed.
Figure 19A:
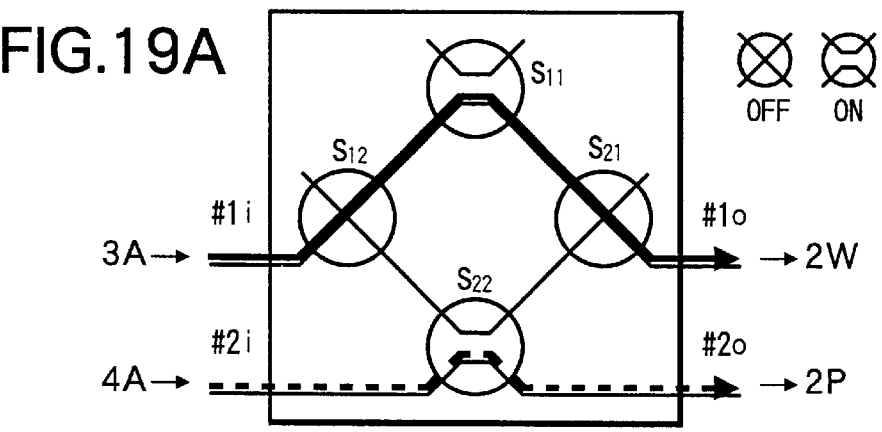
FIG. 19A shows an initial state.
Figure 19B:
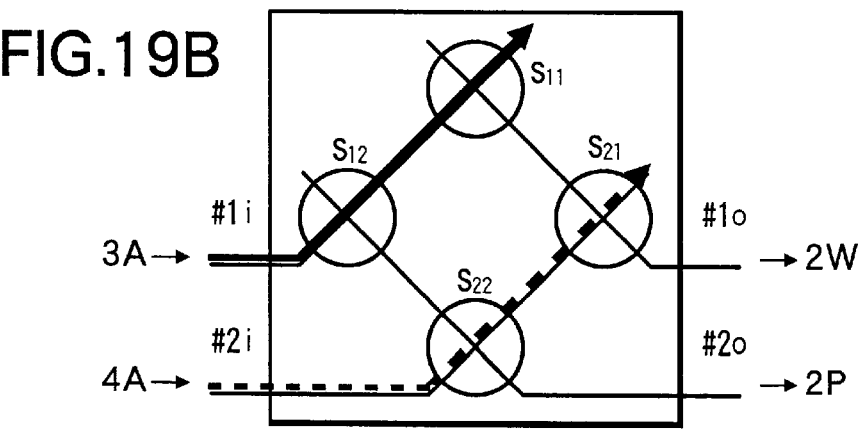
FIG. 19B shows a path release state.
Figure 19C:
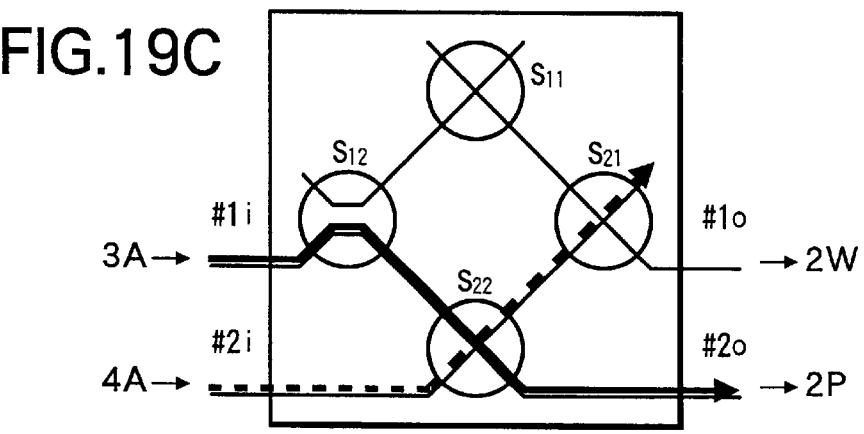
FIG. 19C shows a path reconnection state.
Figure 20:
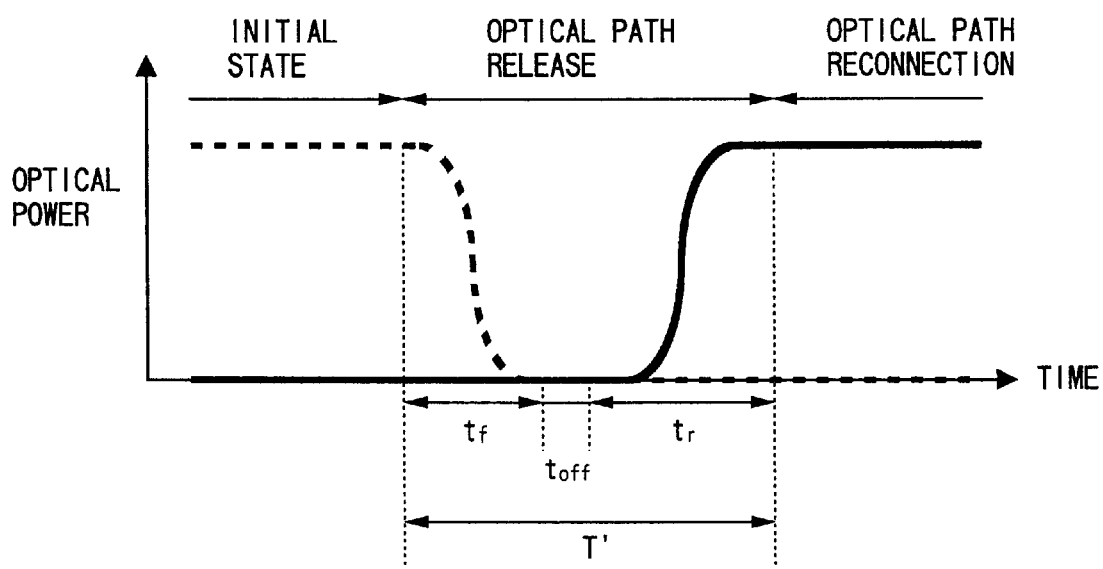
FIG. 20 is a graph showing a transitional state of an optical signal power to be output to a protective ray path in the conventional optical switch changeover controlling method.

FIG. 17 is a graph showing a transition of optical power to be output from the protective path (to E) at the output side of the 4×4 spatial optical switch at the time of connection changeover as described above. As shown in FIG. 17, the optical power to be output from the protective path (to E) is continuously changed over from the power of the PCA optical signal sp input to the protective path (from W) to the power of the client optical signal sc input to the working path (from W). Thus, there can be avoided an interruption at the time of connection changeover, which has been caused in the conventional.

In the above, there has been illustrated the constant interlace type 4×4 spatial optical switch as shown in FIG. 16. However, the constitution of the optical node device to be used in a ring network is not limited thereto, and a matrix type or tree type constitution can be adopted. Further, there has been described the 4-fiber ring network having four units of nodes. However, the present invention is not limited to such a number of nodes and the configuration thereof in the optical network.

What is claimed:

1. An optical switch changeover controlling method for using a spatial optical switch which is provided with a plurality of optical switch elements arranged between a plurality of input terminals and a plurality of output terminals thereof, each of the plurality of optical switch elements being controllable to change over a connection between two input ports and two output ports into one of a parallel state and an interlaced state and having such a characteristic that a power of optical signal to be output from each of the output ports is continuously changed over from a power of optical signal to be input to one of the two input ports, to a power of optical signal to be input to the other of the two input ports, to thereby change over setting of optical paths interconnecting between the plurality of input terminals and the plurality of output terminals of said spatial optical switch, comprising:

when a first optical path directed from a first input terminal to a first output terminal of said spatial optical switch is changed over to a second optical path directed from a second input terminal to the first output terminal, performing an optical path re-setting by initiating re-setting of said respective optical switch elements for forming said second optical path, while keeping the setting of said respective optical switch elements for forming said first optical path, to prepare a state where, for one optical switch element participating in forming both of said first optical path and said second optical path, one of the two input ports is input with an optical signal from said first input terminal and the other of the two input terminals is input with an optical signal from said second input terminal; and performing an optical path reconnection by changing over the connection state of the one optical switch element participating in forming both of said first optical path and said second optical path, set in said optical path re-setting, to the other connection state to thereby release said first optical path and establish the connection of said second optical path.

2. An optical switch changeover controlling method of claim 1, wherein, when said spatial optical switch has one of a matrix type constitution and a constant interlace type constitution, said optical path re-setting additionally brings the optical switch element at an intersection point between said second input terminal and said first output terminal into a parallel state, while keeping the optical switch element at an intersection point between said first input terminal and said first output terminal in a parallel state, and said optical path reconnection changes over said optical switch element at the intersection point between said first input terminal and said first output terminal, to an interlaced state.

3. An optical node device comprising:

a spatial optical switch which is provided with a plurality of optical switch elements arranged between a plurality of input terminals and a plurality of output terminals thereof, each of the plurality of optical switch elements being controllable to change over a connection between two input ports and two output ports into one of a parallel state and an interlaced state and having such a characteristic that a power of optical signal to be output from each of the output ports is continuously changed over from a power of optical signal to be input to one of the two input ports, to a power of optical signal to be input to the other of the two input ports; and controlling means for controlling the connection state of each of said plurality of optical switch elements of said spatial optical switch to thereby change over setting of optical paths interconnecting between the plurality of input terminals and the plurality of output terminals, wherein said controlling means comprises, when a first optical path directed from a first input terminal to a first output terminal of said spatial optical switch is changed over to a second optical path directed from a second input terminal to the first output terminal, an optical path re-setting part initiating re-setting of said respective optical switch elements for forming said second optical path, while keeping the setting of said respective optical switch elements for forming said first optical path, to prepare a state where, for one optical switch element participating in forming both of said first optical path and said second optical path, one of the two input ports is input with an optical signal from said first input terminal and the other of the two input terminals is input with an optical signal from said second input terminal; and an optical path reconnection part changing over the connection state of the one optical switch element participating in forming both of said first optical path and said second optical path, set in said optical path re-setting part, to the other connection state to thereby release said first optical path and establish the connection of said second optical path.

4. An optical node device of claim 3, interlace wherein said spatial optical switch has one of a matrix type constitution and a constant type constitution.

5. An optical node device of claim 4, wherein said optical path re-setting part additionally brings the optical switch element at an intersection point between said second input terminal and said first output terminal into a parallel state, while keeping the optical switch element at an intersection point between said first input terminal and said first output terminal in a parallel state, and said optical path reconnection part changes over said optical switch element at the intersection point between said first input terminal and said first output terminal, to an interlaced state.

6. An optical node device of claim 3, wherein said spatial optical switch has a tree type constitution.

7. An optical node device of claim 3, wherein each of said optical switch elements is constituted to include a Mach-Zehnder interferometer.

8. An optical node device of claim 3, wherein each of said optical switch elements is constituted to include a directional coupler.

9. An optical node device of claim 3, wherein each of said optical switch elements is a total reflection type optical switch element.

10. An optical network including a plurality of optical node devices of claim 3, wherein said optical node devices are interconnected by a plurality of ray paths.

11. An optical switch system comprising:

an optical switch of crossbar type capable of conducting switching control so as to change over a connection between two input ports and two output ports into one of a parallel state and an interlaced state; and an optical amplifier provided at one of an input side and an output side of said optical switch;

wherein said optical switch changes over a ray in an uninterrupted manner, when switching.

* * * * *

UNITED STATES PATENT AND TRADEMARK OFFICE
CERTIFICATE OF CORRECTION

PATENT NO.     : 6,643,422 B2
DATED          : November 4, 2003
INVENTOR(S)    : Toru Katagiri et al.

It is certified that error appears in the above-identified patent and that said Letters Patent is hereby corrected as shown below:

<u>Column 14,</u>
Line 14, please delete "interlace".

Signed and Sealed this

Thirtieth Day of December, 2003

JAMES E. ROGAN
*Director of the United States Patent and Trademark Office*